US008553045B2

(12) United States Patent
Skaff et al.

(10) Patent No.: US 8,553,045 B2
(45) Date of Patent: Oct. 8, 2013

(54) SYSTEM AND METHOD FOR IMAGE COLOR TRANSFER BASED ON TARGET CONCEPTS

(75) Inventors: Sandra Skaff, Grenoble (FR); Naila Murray, Strasbourg (FR); Luca Marchesotti, Grenoble (FR); Florent Perronnin, Domène (FR)

(73) Assignee: Xerox Corporation, Norwalk, CT (US)

( * ) Notice: Subject to any disclaimer, the term of this patent is extended or adjusted under 35 U.S.C. 154(b) by 469 days.

(21) Appl. No.: 12/890,049

(22) Filed: Sep. 24, 2010

(65) Prior Publication Data
US 2012/0075329 A1 Mar. 29, 2012

(51) Int. Cl.
G09G 5/02 (2006.01)
(52) U.S. Cl.
USPC .......................................... 345/593; 345/589
(58) Field of Classification Search
USPC ................................................ 345/593, 589
See application file for complete search history.

(56) References Cited

U.S. PATENT DOCUMENTS

| | | | |
|---|---|---|---|
| 5,642,137 A | 6/1997 | Kitazumi | |
| 2002/0015536 A1* | 2/2002 | Warren et al. | 382/284 |
| 2003/0012428 A1 | 1/2003 | Syeda-Mahmood | |
| 2003/0021481 A1 | 1/2003 | Kasutani | |
| 2003/0146925 A1 | 8/2003 | Zhao et al. | |
| 2004/0164991 A1 | 8/2004 | Rose | |
| 2006/0066629 A1 | 3/2006 | Norlander et al. | |
| 2006/0164664 A1 | 7/2006 | Lee | |
| 2007/0005356 A1 | 1/2007 | Perronnin | |
| 2007/0258648 A1 | 11/2007 | Perronnin | |
| 2008/0046410 A1 | 2/2008 | Lieb | |
| 2008/0069456 A1 | 3/2008 | Perronnin | |
| 2008/0129750 A1* | 6/2008 | Voliter et al. | 345/593 |
| 2008/1024057 | 10/2008 | Hoshii | |
| 2008/0317358 A1 | 12/2008 | Bressan et al. | |
| 2009/0144033 A1 | 6/2009 | Perronnin | |
| 2009/0231355 A1* | 9/2009 | Perronnin | 345/594 |
| 2010/0040285 A1 | 2/2010 | Csurka et al. | |
| 2010/0092084 A1 | 4/2010 | Perronnin et al. | |
| 2010/0098343 A1 | 4/2010 | Perronnin et al. | |

OTHER PUBLICATIONS

An, et al. "User-controllable color transfer," Computer Graphics Forum (Eurographics) 29, 2 (May 2010), 263-271(9).
Berlin, et al. *Basic Color Terms: Their Universality and Evolution.* Berkeley: University of California Press, University of California, 1969—Abstract Only.

(Continued)

*Primary Examiner* — Maurice L McDowell, Jr.
(74) *Attorney, Agent, or Firm* — Fay Sharpe LLP

(57) ABSTRACT

A method for color transfer includes retrieving a concept color palette from computer memory corresponding to a concept selected by a user. The concept color palette includes a first set of colors, which may be statistically representative of colors of a set of predefined color palettes which have been associated with the concept. The method further includes computing an image color palette for an input image. The image color palette includes a second set of colors that are representative of pixels of the input image. Colors of the image color palette are mapped to colors of the concept color palette to identify, for colors of the image color palette, a corresponding color in the concept color palette. A transformation is computed based on the mapping. For pixels of the input image, modified color values are computed, based on the computed transformation, to generate a modified image.

26 Claims, 6 Drawing Sheets

(56) References Cited

OTHER PUBLICATIONS

Benavente, et al. "Parametric fuzzy sets for automatic color naming," Journal of the Optical Society of America, A 25, 10 (Oct. 2008), 2582-2593.
Charpiat, et al. "Automatic image colorization via multimodal predictions," In ECCV '08: Proceedings of the 10th European Conference on Computer Vision (Berlin, Heidelberg, 2008), Springer-Verlag, pp. 126-139.
Colorlovers: www.colourlovers.com—accessed Sep. 23, 2010.
Conway, D. "An experimental comparison of three natural language colour naming models," In East-West International Conference on Human-Computer Interactions (1992), pp. 328-339.
Dempster, et al. "Maximum likelihood from incomplete data via the EM algorithm," Journal of the Royal Statistical Society, 39, 1-38, 1977.
Fellner, et al. "Automatic Concept Transfer," Computer Graphics forum , vol. 0 (1981), No. 0, pp. 1-11.
Freedman, et al. "Object-to-object color transfer: optimal flows and smsp transformations," In IEEE Conference on Computer Vision and Pattern Recognition (Jun. 2010).
U.S. Appl. No. 12/693,795, filed Jan. 26, 2010, Skaff, et al.
U.S. Appl. No. 12/632,107, filed Dec. 7, 2009, Marchesotti, et al.
U.S. Appl. No. 12/512,209, filed Jul. 30, 2009, Perronnin, et al.
Greenfield, et al. "A Palette-Driven Approach to Image Color Transfer," *Eurographics Workshop on Computational Aesthetics in Graphics, Visualization and Imaging*, 91-99, 2005.
Greenfield, et al. "Image recoloring induced by palette color associations," In International Conference on Computer Graphics, Visualization and Computer Vision (2003).
Huang, et al. "Landmark-based sparse color representations for color transfer," In Computer Vision, 2009 IEEE 12th International Conference on (Sep. 2009), pp. 199-204.
Hou, et al. "Color conceptualization," In Multimedia '07: Proceedings of the 15th international conference on Multimedia (New York, NY, USA, 2007), ACM, pp. 265-268.
Jegou, et al. "Improving Bag-Of-Features for Large Scale Image Search," in IJCV. May 2010.
Lammens, A. "Computational Model of Color Perception and Color Naming," PhD thesis, University of Buffalo, 1994.
Lalonde , et al. "Using color compatibility for assessing image realism," In Computer Vision, 2007. ICCV 2007. IEEE 11th International Conference on (2007), pp. 1-8.
Lashkari, et al. "Convex clustering with exemplar-based models," In Advances in Neural Information Processing Systems 20, Platt J., Koller D., Singer Y., Roweis S., (Eds.) MIT Press, Cambridge, MA, 2008, pp. 825-832.
Levin, et al. "Colorization using optimization," ACM Trans. Graph. 23, 3 (2004), 689-694.
Ou, et al. "A study of colour emotion and colour preference. part i: Colour emotions for single colours," Color Research and Application 29, 3 (Jun. 2004), 232-240.
Ou, et al. "A study of colour emotion and colour preference. part ii: Colour emotions for two-colour combinations," Color Research and Application 29: 292-298 (2004).
Ou, et al. "A study of colour emotion and colour preference. part iii: Colour preference modeling," Color Research and Application 29: 381-389 (2004).
Perronnin, et al. "Fisher Kernels on Visual Vocabularies for Image Categorization," in Proc. of the IEEE Conf on Computer Vision and Pattern Recognition (CVPR), Minneapolis, MN, USA (Jun. 2007).
Pitie, et al. "Ndimensional probability density function transfer and its application to colour transfer," In IEEE International Conference on Computer Vision (2005), vol. 2, pp. 1434-1439.
Qu, et al. "Manga colorization," ACM Trans. Graph. 25, 3 (2006), 1214-1220.
Reinhard, et al. "Color transfer between images," IEEE Computer Graphics Applications 21, 5 (Sep./Oct. 2001), 34-41.
Reynolds, et al. "Speaker verification using adapted gaussian mixture models," In Digital Signal Processing (2000), No. 10, pp. 19-41.
Rubner, et al. "The earth mover's distance as a metric for image retrieval," Int. J. Comput. Vision 40, 2 (2000), 99-121.
Tai, et al. "Local color transfer via probabilistic segmentation by expectation-maximization," In IEEE International Conference on Computer Vision and Pattern Recognition (2005), vol. 1, pp. 747-754.
Van De Weijer, et al. "Learning color names for real-world applications," IEEE Transactions on Image Processing 18, 7 (Jul. 2009), 1512-1523.
Woolfe, et al. "Natural Language Color Editing," *Proc of the ist XIG Research and Technology Conference*, 2006.
Xiao, et al. "Color transfer in correlated color space," In VRCIA '06: Proceedings of the 2006 ACM international conference on Virtual reality continuum and its applications (New York, NY, USA, 2006), ACM, pp. 305-309.
Yang, et al. "Automatic mood-transferring between color images," IEEE Computer Graphics and Applications 28, 2 (Mar.-Apr. 2008), 52-61.
Zheng, et al. "Tour the World: Building a web-scale landmark recognition engine," IEEE Computer Society Conference, 2009.

\* cited by examiner

SYSTEM AND METHOD FOR IMAGE COLOR TRANSFER BASED ON TARGET CONCEPTS

CROSS REFERENCE TO RELATED PATENTS AND APPLICATIONS

Cross reference is made to the following co-pending applications, the disclosures of which are incorporated herein in their entireties, by reference:

U.S. patent application Ser. No. 12/693,795, filed on Jan. 26, 2010, entitled A SYSTEM FOR CREATIVE IMAGE NAVIGATION AND EXPLORATION, by Sandra Skaff, et al.

U.S. patent application Ser. No. 12/632,107, filed Dec. 7, 2009, entitled SYSTEM AND METHOD FOR CLASSIFICATION AND SELECTION OF COLOR PALETTES, by Luca Marchesotti, et al.

BACKGROUND

The exemplary embodiment relates to the image processing, image presentation, photofinishing, and related arts. It finds particular application to the modification of colors of an image to match a selected concept.

The rise of digital photography and digital video has empowered amateur and professional photographers and cinematographers to perform photographic and video processing previously requiring expensive and complex darkroom facilities. Today, document designers can utilize photofinishing software to perform operations such as image cropping, brightness, contrast, and other image adjustments, merging of images, resolution adjustment, and the like on a personal computer. Users also have access to large databases of images through online resources.

The colors of an image can convey an abstract concept to a viewer. An abstract concept can be a particular mood, such as romantic, calm, or the like, which is distinct from the content of the image. Designers sometimes make color adjustments to an image to convey a particular mood. Image processing software provides a wide range of color adjustments, such as color balance, hue, saturation, and intensity, typically with fine control such as independent channel adjustment capability for the various channels (e.g., the red, green, and blue channels in an RGB color space). However, manipulation of image colors can be difficult and time-consuming.

One method for mood-based color transfer is described in Yang, C.-K. & Peng, L.-K., "Automatic Mood-Transferring between Color Image." *IEEE Computer Graphics and Applications*, 28, 52-61, 2008 ("Yang and Peng"). This method uses a target image for the transfer, making it difficult for a user to conceptualize the transfer result or to make slight modifications to it. In addition, concepts are each designated by a respective color. The modifications produced by this method yield an image which is dominated by a single color and can only be used for images which satisfy a dominance constraint themselves, limiting the usefulness of the method. Another color modification method, which uses a target palette extracted from a target image, is disclosed in Greenfield, G. R. & House, D. H., "A Palette-Driven Approach to Image Color Transfer," *Eurographics Workshop on Computational Aesthetics in Graphics, Visualization and Imaging*, 91-99, 2005.

The exemplary embodiment provides a system and method for modifying colors of an image by selecting a concept in natural language, thus making the task much simpler for the non-skilled user.

INCORPORATION BY REFERENCE

The following references, the disclosures of which are incorporated herein by reference in their entireties, are mentioned:

U.S. Pub No. 20090231355, published Sep. 17, 2009, entitled COLOR TRANSFER BETWEEN IMAGES THROUGH COLOR PALETTE ADAPTATION, by Florent Perronnin, discloses an image adjustment method. This includes adapting a universal palette to generate input image and reference image palettes statistically representative of pixels of input and reference images. Some of the pixels of the input image are adjusted to generate adjusted pixels that are statistically represented by the reference image palette.

Color palettes are also disclosed, for example, in U.S. Pub No. 20030146925, published Aug. 7, 2003, entitled GENERATING AND USING A COLOR PALETTE, by Jun Zhao, et al.; U.S. Pub. No. 20060066629, published Mar. 30, 2006, entitled SYSTEM AND METHOD FOR COLOR SELECTION, by Rebecca Norlander, et al.; U.S. Pat. No. 5,642,137, issued Jun. 24, 1997, entitled COLOR SELECTING METHOD, by Kitazumi; and U.S. Pub. No 20040164991, published Aug. 26, 2004, entitled COLOR PALETTE PROVIDING CROSS-PLATFORM CONSISTENCY, by Brian Rose.

The following references relate generally to visual classification and image retrieval methods: U.S. Pub. No. 20070005356, published Jan. 4, 2007, entitled GENERIC VISUAL CATEGORIZATION METHOD AND SYSTEM, by Florent Perronnin; U.S. Pub. No. 20070258648, published Nov. 8, 2007, entitled GENERIC VISUAL CLASSIFICATION WITH GRADIENT COMPONENTS-BASED DIMENSIONALITY ENHANCEMENT, by Florent Perronnin; U.S. Pub. No. 20080069456, published Mar. 20, 2008, entitled BAGS OF VISUAL CONTEXT-DEPENDENT WORDS FOR GENERIC VISUAL CATEGORIZATION, by Florent Perronnin; U.S. Pub. No. 20080317358, published Dec. 25, 2008, entitled CLASS-BASED IMAGE ENHANCEMENT SYSTEM, by Marco Bressan, et al.; U.S. Pub. No. 20090144033, published Jun. 4, 2009, entitled OBJECT COMPARISON, RETRIEVAL, AND CATEGORIZATION METHODS AND APPARATUSES, by Florent Perronnin, et al.; U.S. Pub. No. 20100040285, published Feb. 18, 2010, entitled SYSTEM AND METHOD FOR OBJECT CLASS LOCALIZATION AND SEMANTIC CLASS BASED IMAGE SEGMENTATION, by Gabriela Csurka, et al.; U.S. Pub. No. 20100092084, published Apr. 15, 2010, entitled REPRESENTING DOCUMENTS WITH RUN-LENGTH HISTOGRAMS, by Florent Perronnin, et al.; U.S. Pub. No. 20100098343, published Apr. 22, 2010, entitled MODELING IMAGES AS MIXTURES OF IMAGE MODELS, by Florent Perronnin, et al.; U.S. Pub. No. 20030021481, published Jan. 30, 2003, entitled IMAGE RETRIEVAL APPARATUS AND IMAGE RETRIEVING METHOD, by E. Kasutani; U.S. Pub. No. 20080240572, published Oct. 2, 2008, entitled IMAGE SEARCH APPARATUS AND IMAGE SEARCH METHOD, by J. Hoshii; U.S. application Ser. No. 12/512,209, filed Jul. 30, 2009, entitled COMPACT SIGNATURE FOR UNORDERED VECTOR SETS WITH APPLICATION TO IMAGE RETRIEVAL, by Florent Perronnin, et al.; above-mentioned U.S. patent application Ser. No. 12/693,795; Perronnin, F., Dance, C., "Fisher Kernels on Visual Vocabularies for image Categorization," in Proc. of the IEEE Conf on Computer Vision and Pattern Recognition (CVPR), Minneapolis, MN, USA (June 2007); Yan-Tao Zheng, Ming Zhao, Yang Song, H. Adam, U. Buddemeier, A. Bissacco, F. Brucher, Tat-Seng Chua, and H.

Neven, "Tour the World: Building a web-scale landmark recognition engine," IEEE Computer Society Conference, 2009; Herve Jegou, Matthijs Douze, and Cordelia Schmid, "Improving Bag-Of-Features for Large Scale Image Search," in IJCV, 2010.

The following relate generally to extraction of colors from images or image querying based on color: U.S. Pub. No. 20080046410, published Feb. 21, 2008, entitled COLOR INDEXING AND SEARCHING FOR IMAGES, by Adam Lieb; U.S. Pub. No. 20030012428, published Jan. 16, 2003, entitled METHOD AND APPARATUS FOR INDEXING AND RETRIEVING IMAGES FROM AN IMAGE DATABASE BASED ON A COLOR QUERY, by T. F. Syeda-Mahmood; and U.S. Pub. No. 20060164664, published Jul. 27, 2006, entitled COLOR QUANTIZATION AND METHOD THEREOF AND SEARCHING METHOD USING THE SAME, by J. S. Lee.

BRIEF DESCRIPTION

In accordance with one aspect of the exemplary embodiment, a method for color transfer includes retrieving a concept color palette from computer memory corresponding to a user-selected concept, the concept color palette comprising a first set of colors. An image color palette for an input image is computed. The image color palette includes a second set of colors that are representative of pixels of the input image. Colors of the image color palette are mapped to colors of the concept color palette to identify, for colors of the image color palette, a corresponding color in the concept color palette. A transformation is computed, based on the mapping. For pixels of the input image, modified color values are computed, based on the computed transformation, to generate a modified image.

In accordance with another aspect of the exemplary embodiment, an image adjustment apparatus includes memory which stores a set of concept palettes, each concept palette comprising a respective set of colors and being associated in the memory with a respective natural language description. Instructions are stored in memory for retrieving one of the concept color palettes from the memory corresponding to a user-selected concept, the concept color palette comprising a first set of colors, receiving a user-selected input image and computing an image color palette for the input image, the image color palette comprising a second set of colors, mapping colors of the image color palette to colors of the concept color palette to identify, for each of the colors of the image color palette, a corresponding color in the concept color palette, computing a transformation based on the mapping, and for pixels of the input image, computing modified color values based on the computed transformation to transform the input image. A processor, in communication with the memory, executes the instructions.

In accordance with another aspect of the exemplary embodiment, a graphical user interface is implemented by a processor executing instructions stored in memory. The graphical user interface is configured for displaying an input image and a set of concepts for selection of one of the concepts by a user. The graphical user interface is further configured for displaying a modified image whose colors have been transformed based on a stored concept palette corresponding to the user-selected one of the concepts.

DETAILED DESCRIPTION

Figure 1:
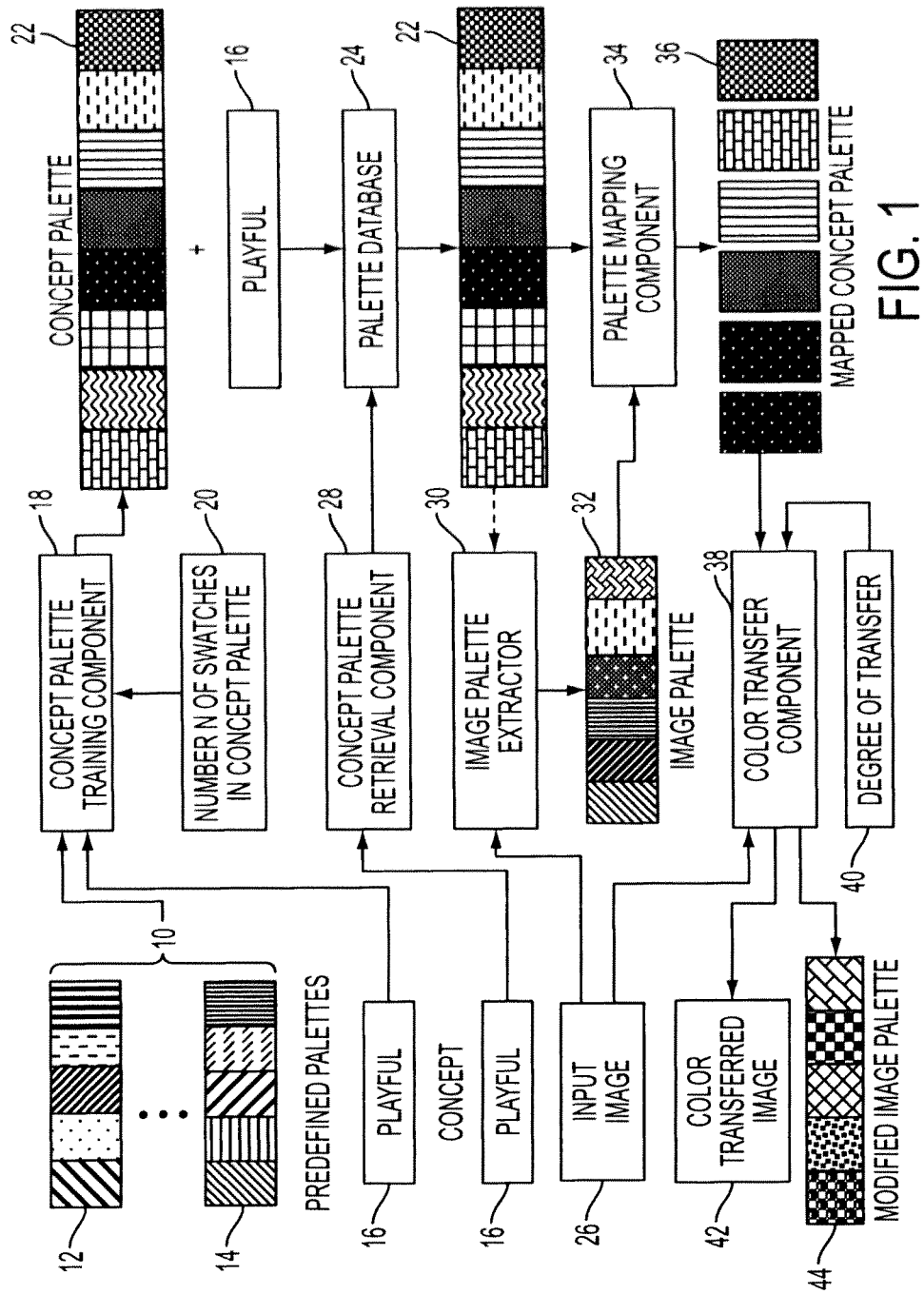
FIG. 1 is a schematic diagram illustrating aspects of a system and method for color transfer in accordance with the exemplary embodiment.

Aspects of the exemplary embodiment relate to a system and a method for concept-based color transfer. Concept-based transfer is an alteration of the colors of an input image. This operation is performed taking as a reference, a pre-computed color model related to the target concept. The term "concept" is used to refer to emotions, moods, and any other aesthetic concepts. A concept can be, for example, "romantic", "adult", "serene", etc.

The exemplary method is particularly useful for unskilled users which have to design graphic-rich documents while adhering to a particular theme. A user may be fully aware of the message he or she wants to convey, but uncertain about the colors to use for a document or image. The exemplary system and method provide for a change in the chromatic appearance of an image or document according to a specific concept. The concepts are represented through color models in the form of color palettes.

A "color palette," as used herein, is a limited set of different colors, which may be displayed as an ordered or unordered sequence of swatches, one for each color in the set. A "predefined color palette" is a color palette stored in memory. The colors in a predefined color palette may have been selected by a graphic designer, or other skilled artisan working with color, to harmonize with each other, when used in various combinations. Each predefined color palette may have the same number (or different numbers) of visually distinguishable colors. In general, the predefined color palettes each include at least two colors, such as at least three colors, e.g., up to ten colors, such as three, four, five, or six different colors. These colors are manually selected, in combination, to express a particular aesthetic concept. It is not necessary for the predefined color palettes to all have the same number of swatches. Predefined color palettes of interest herein are generally those which are tagged with a corresponding label related to a concept.

A "concept palette" is a color palette which has been derived from a set of predefined color palettes that have been associated with a target concept. As such, the colors of the concept palette are automatically, rather than manually, generated. The concept palette may include, for example, at least five or at least eight colors and in one embodiment, sixteen colors. For example, the concept palette for each predefined concept has no more than 50 colors. In the exemplary embodiment, a concept palette includes substantially fewer colors than the total of all colors of the predefined color palettes from which it is derived.

An "image palette" refers to a color palette which has been extracted from a digital image, based on the colors present in the digital image. The exemplary image palette is statistically representative of colors in the image. In the exemplary embodiment, each image palette has the same number of colors. For example, the extracted color palette may have at least four and, in one embodiment, at least five colors, such as eight or sixteen colors. For example, the image palette has no more than 50 colors. As will be appreciated, a digital photographic image typically has far more different colors and the extracted color palette includes many fewer colors than the digital image from which it is extracted. In one embodiment, a concept palette has at least as many colors as an image palette.

A "user" can be any person or persons having access to a database of digital images, such as a graphic designer amateur photographer, or the like.

The term "color" is used to refer to any aspect of image pixels, including, but not limited to, absolute color values, such as hue, chroma, and lightness, and relative color values, such as differences in hue, chroma, and lightness. Color can be expressed, for example, in a two, three, or more coordinate color space, such as RGB, L*, a*, b*, YCbCr, Luv, XYZ, CMYK, etc. Color, as used herein, is not limited to chromatic colors but also includes black and white. For example, the "color" may be characterized by one, two, or all three of the red, green, and blue pixel coordinates in an RGB color space representation, or by one, two, or all three of the L, a, and b pixel coordinates in a Lab color space representation. Moreover, while the color adjustment techniques are described herein with illustrative reference to two-dimensional images such as photographs or video frames, it is to be appreciated that these techniques are readily applied to three-dimensional images as well.

A "digital image" (or simply "image") can be any convenient file format, such as JPEG, Graphics Interchange Format (GIF), JBIG, Windows Bitmap Format (BMP), Tagged Image File Format (TIFF), JPEG File Interchange Format (JFIF), Delrin Winfax, PCX, Portable Network Graphics (PNG), DCX, G3, G4, G3 2D, Computer Aided Acquisition and Logistics Support Raster Format (CALS), Electronic Arts Interchange File Format (IFF), IOCA, PCD, IGF, ICO, Mixed Object Document Content Architecture (MO:DCA), Windows Metafile Format (WMF), ATT, (BMP), BRK, CLP, LV, GX2, IMG(GEM), IMG(Xerox), IMT, KFX, FLE, MAC, MSP, NCR, Portable Bitmap (PBM). Portable Greymap (PGM), SUN, PNM, Portable Pixmap (PPM), Adobe Photoshop (PSD), Sun Rasterfile (RAS), SGI, X BitMap (XBM), X PixMap (XPM), X Window Dump (XWD), AFX, Imara, Exif, WordPerfect Graphics Metafile (WPG), Macintosh Picture (PICT), Encapsulated PostScript (EPS), or other common file format used for images and which may optionally be converted to another suitable format prior to processing. Digital images may be individual photographs, graphics, video images, or combinations thereof. In general, each input digital image includes image data for an array of pixels forming the image. The image data may include colorant values (which may be referred to herein as grayscale values), for each of a set of at least three color separations, such as RGB, or be expressed in another color space in which different colors can be represented. In general, "grayscale" refers to the optical density value of any single color channel, however expressed (RGB, YCbCr, L*a*b*, etc.). The exemplary embodiment is not intended for black and white (monochrome) images, although it could be modified to allow incorporation of such images. In displaying or processing an image, a reduced pixel resolution version ("thumbnail") of a stored digital image may be used, which, for convenience of description, is considered to be the image.

With reference to FIG. 1, an overview of the exemplary system and method for color transfer is shown. An offline stage includes inputting a set 10 of predefined color palettes 12, 14, etc., that are associated with a given concept 16, such as "playful," to a palette training component 18. For example, at least 10 or at least 20 predefined color palettes per concept are used in the concept palette learning. There may be, for example, at least 5 or at least 10 predefined concepts, such as up to 100 concepts, each with an associated natural language description. A number N of colors 20 may also be input to the palette training component 18 (or established by default). The training component 18 outputs a concept palette 22 with N colors, based on the set 10 of predefined color palettes. This training step is repeated for each of the set of concepts 16, with a different set of color palettes for each concept. The result is a set of concept palettes 22, stored in memory such as the illustrated palettes database 24, where each concept palette is linked to its respective concept 16 or a reference thereto.

At run time, a user selects an input image 26, which may be the user's own image or one selected from a database created by other users, and selects a target concept 16 from the set of concepts. A concept palette retrieval component 28 retrieves the concept palette 22 from the database 24 which matches the selected concept 16. An image palette extractor 30 extracts an image palette 32 from the selected image 26. A palette mapping component 34 maps the image palette 32 to the retrieved concept palette 22 to identify a mapped concept palette 36. The mapped concept palette 36 includes at least some or all of the colors in the retrieved concept palette 22, which may be reordered to best match the colors of the image palette 32. A color transfer component 38 transfers colors to the image based on the colors of pixels in the input image 26, the mapped concept palette 36, and optionally a degree of transfer 40. The output is a modified image 42, in which colors of the input image 26 have been modified ("transferred"), based on the mapped concept palette 36 and optionally a degree of transfer 40. A modified image palette 44, derived from the modified image 42 by the image palette extractor 30, may also be output. For example, all the colors, or the most dominant of the colors, in the modified image palette 44, may be displayed, together with the modified image 42.

For ease of illustration, the colors of the palettes 12, 14, 22, 36, 44 in FIG. 1 are shown in black and white with different shading to indicate the different colors. Additionally, while each palette is shown with up to eight colors, it is to be appreciated that the palettes may include more colors, as previously discussed. Moreover, the palettes may be stored in computer memory as color values in any suitable color space, such as their a and b channel values in the Lab color space, and may be converted to another color space, such as RGB, for display on a screen as illustrated graphically in the exemplary screenshots 50, 52 shown in FIGS. 2 and 3.

Figure 4:
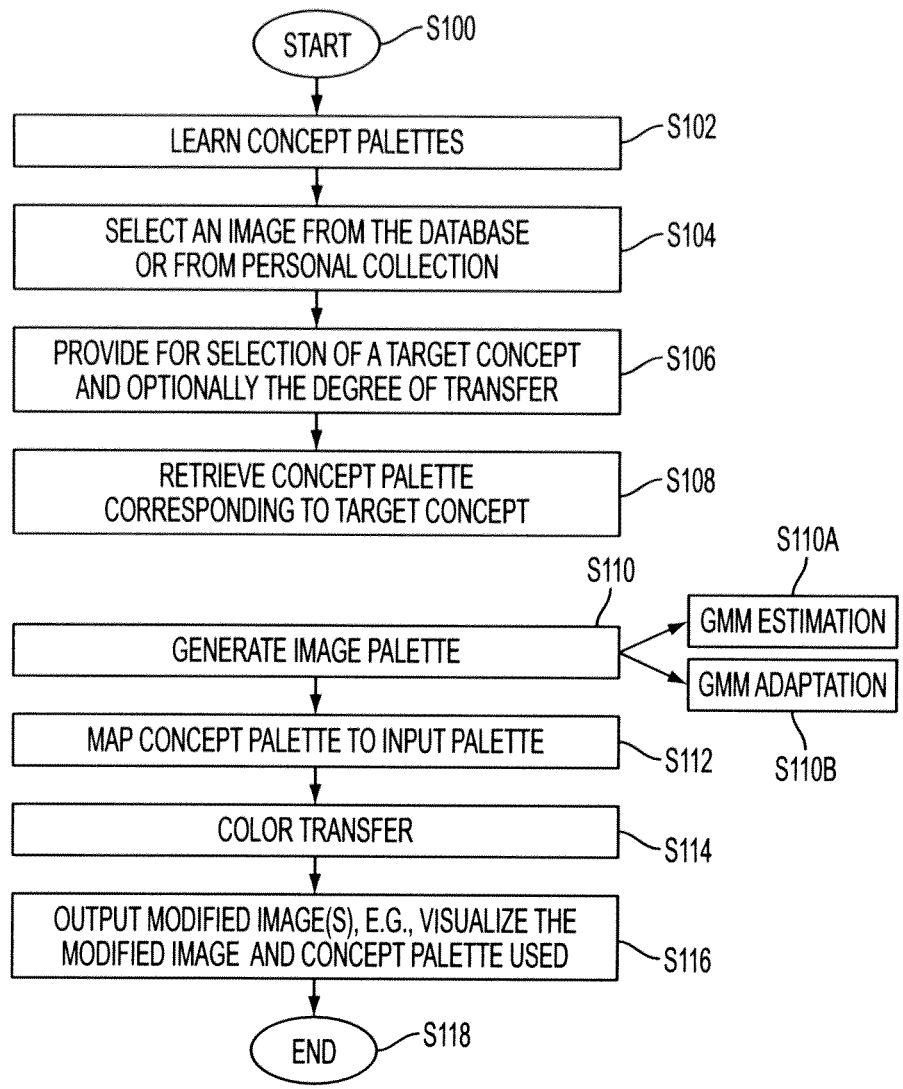
FIG. 4 is a flow chart illustrating a method for image color transfer in accordance with one aspect of the exemplary embodiment.

With reference also to FIG. 4, a method for color transfer using a target concept is shown. As noted above, the method takes as input an image 26 and a target concept 16 and modifies the image pixels based on colors of a corresponding concept palette 22. The method begins at S100.

At S102, a concept palette 22 is learned for each aesthetic concept 16 in a set of concepts, each concept having a natural language description. The concept palettes are each learned from a corresponding set of predefined palettes 12, 14, etc. The concept palettes 22 are stored in memory. Once this step is complete, the predefined palettes 12, 14, are no longer needed.

At S104, an image 26 to be modified is input. In particular, provision is made, e.g., via a graphical user interface (FIG. 2), for a user to select an image to be modified in accordance with the exemplary method. For example, an image 26 may be selected from a user's collection or a database of images.

At S106, provision is made, e.g., via a graphical user interface (FIG. 2), for a user to select a target concept 16 from a set of displayed concepts. The displayed concepts may be all or only a computed subset of the available concepts. The user may also be provided with the opportunity to select a degree of transfer, at this time or later.

At S108, a concept palette 22 corresponding to the target concept 16 is retrieved. The concept palette may be displayed to the user. The user may be permitted to modify the displayed concept palette, for example, by adding deleting, or adjusting the colors in the concept palette.

At S110, an image palette 32 is extracted from the input image 26. The image palette may learned solely from the image pixels (S110A) or by adapting the retrieved concept palette 22 (S110B).

At S112, the image palette is mapped to the concept palette to generate a mapped concept palette 36. In some embodiments, mapping (S112) and image palette extraction (S110B) are accomplished at the same time, as described in greater detail below.

At S114, the colors of the mapped concept palette 36 are transferred to the input image 26.

Figure 3:
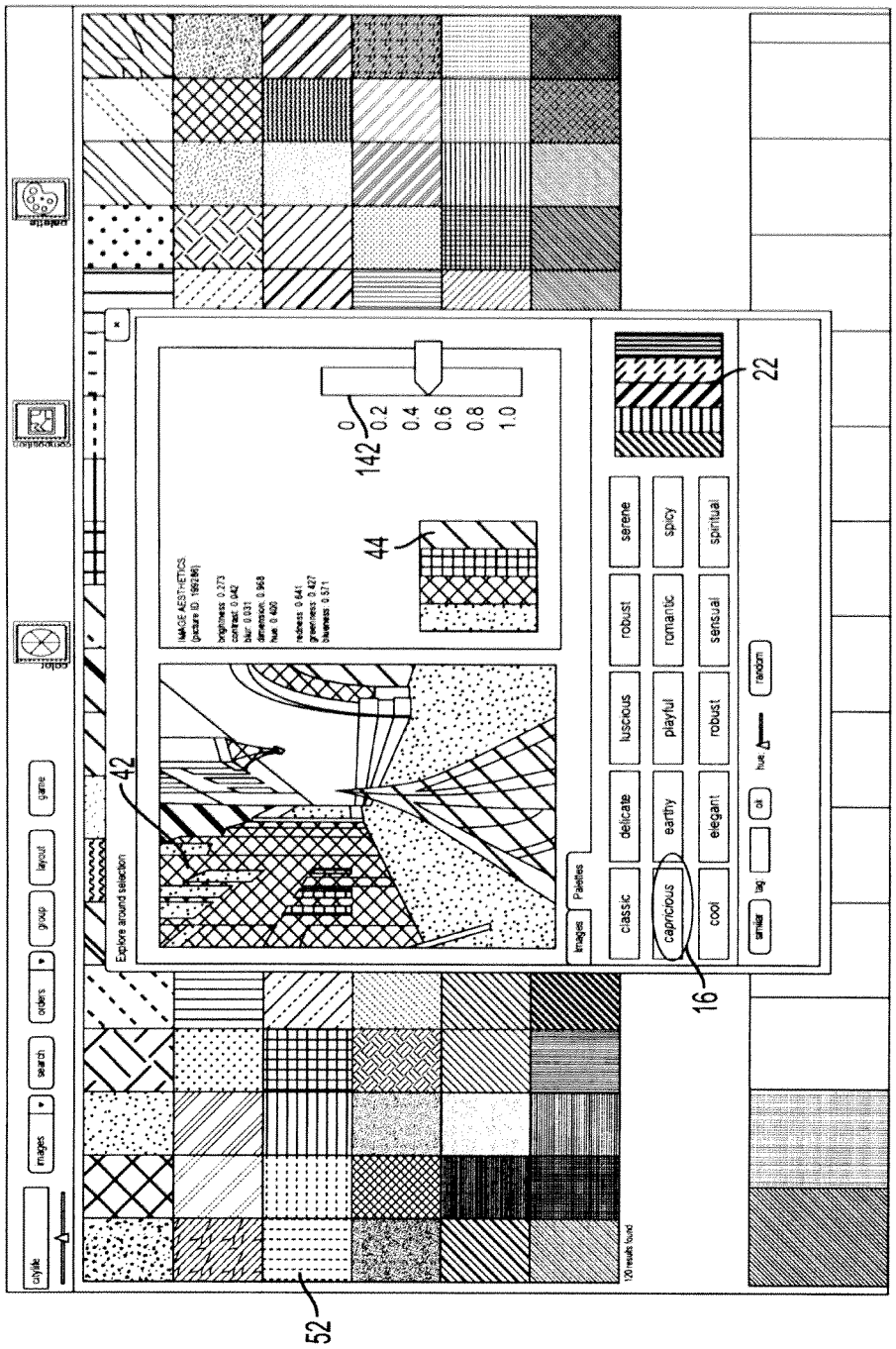
FIG. 3 is a screen shot illustrating the graphical user interface of FIG. 2 displaying a transferred image and modified image palette.

At S116, the modified image is output, e.g., visualized on a screen (FIG. 3). The modified image palette 44 extracted from the modified image may also be displayed. In other embodiments, the modified image, or a document containing it, may be output to another image processing component for further processing, output to a printer, or the like.

The method ends at S118.

The method illustrated in FIG. 4 may be implemented in a computer program product that may be executed on a computer. The computer program product may comprise a non-transitory, tangible computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIG. 4, can be used to implement the exemplary method.

The exemplary method based on learning concept color palettes has several advantages over traditional transfer methods:

1. Higher usability: Users only need to select a target concept in a natural language, thereby eliminating the need to browse through numerous images to find a target image with the appropriate colors. The method has the capability of conceptualizing the potential color transfer.

2. Higher flexibility: i. Users can alter the concept palettes by deleting or adding color swatches; ii. Users can tune the final results of the transferring operation according to their own preference.

3. Improved performance: Since concepts are represented using distributions of colors, the exemplary method is more robust than state-of-the-art methods where only one color is heuristically associated to a concept.

Figure 5:
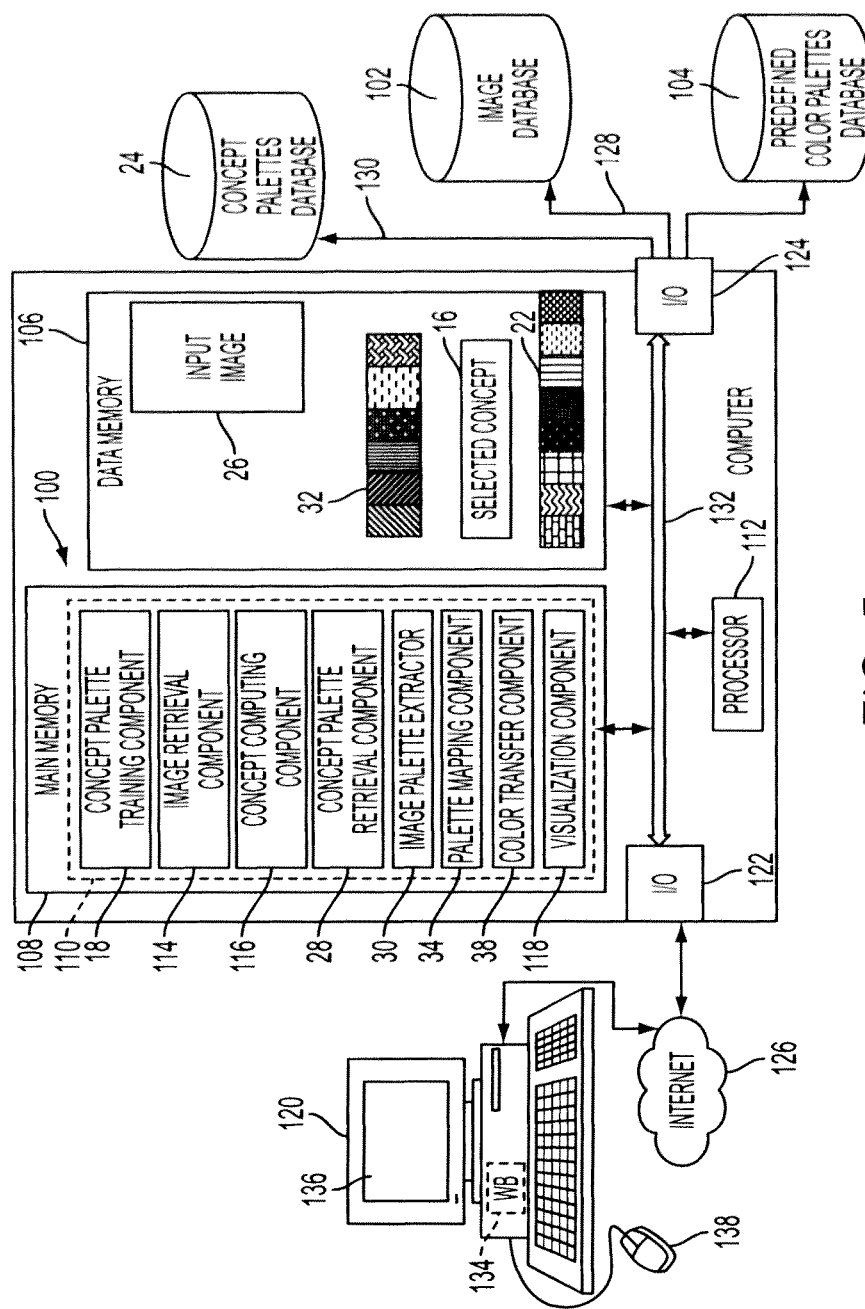
FIG. 5 is a functional block diagram of a system for image color transfer in accordance with another aspect of the exemplary embodiment.

As illustrated in FIG. 5, the method can be implemented using a computer system 100 that is communicatively linked to a database 102 of digital images 26, to the database 24 of concept palettes 22, and optionally to a database 104 from which the sets 10 of predefined color palettes are obtained. These databases 24, 102 may be resident in the computer system 100 or stored in memory accessible thereto. For an image 26 selected from the database 102, the colors of the image can be modeled by the system 100 using a Gaussian mixture model (GMM). The exemplary GMM is composed of M Gaussians to provide an extracted image color palette 32, where M is the number of colors in the extracted image color palette 32 (16 in the exemplary embodiment). The selected image 26, extracted image palette 32, selected concept 16, and retrieved concept palette 22 may be temporarily stored in data memory 106 of the system 100.

Main memory 108 of the system 100 stores instructions 110 for performing the exemplary method. The instructions are executed by a computer processor 112, such as the computer system's CPU. The instructions are illustrated as components 18, 28, 30, 34, 38, 114, 116, 118, which in the exemplary embodiment are in the form of software implemented by the processor 112. However, it is also contemplated that some or all of these components may be implemented as separate hardware components.

Briefly, the components include a concept palette training component 18, which generates a concept palette 22 for each concept. This component can be omitted once the concept palettes have been learned and stored. Or, it may be retained for developing new concept palettes as new concepts are added. An image retrieval component 114 may be provided for assisting a user to select an image from the database, e.g., based on user-input selection criteria. Optionally, a concept computing component 116, computes a subset of the set of components for presenting to a user, which limits the user's choice of a target concept 16 to those in the subset. A concept palette retrieval component 28, as discussed above, retrieves a concept palette 22 from the database in response to the input target concept 16. An image palette extractor 30 extracts an image palette 32 from the selected image 26. This component may also serve to extract a modified image palette 44 from the color transferred image 42. The palette mapping component 34 maps the image palette 32 to the retrieved concept palette 22 to identify a mapped concept palette 36. In some embodiments, the mapping component is integral with the image palette extractor, as described in further detail below. The color transfer component 38 computes, for each pixel of the image, its new color, based on its color values, the mapped concept palette, and the degree of transfer, to generate the color transferred image 42. A visualization component 118, alone or in cooperation with software on a client computing device 120, generates a visualization of the modified image 42 and/or its extracted palette 44.

The exemplary system 100 is in the form of a server computer which includes one or more input/output components 122, 124 such as a modem, for communicating with the client device 120 and databases 24, 102, e.g., via wired wireless links 126, 128, 130, such as a local area network, wide area network, or the Internet. The various components 106, 110, 112, 122, 124 of the system 100 may be communicatively connected by a bus 132.

In the exemplary embodiment, the system 100 is hosted by a server computer which hosts a service provider's website which is accessible via a user's web browser 134 on the client device 120. In other embodiments, all or a portion of the system 100 may be resident on the user's computer 120.

The computers 100, 120, may each comprise one or more computing devices, such as a PC, such as a desktop, a laptop, or palmtop computer, portable digital assistant (PDA), server computer, cellular telephone, digital camera, pager, or other computing device capable of executing instructions for performing the exemplary method. As will be appreciated, the user's computer 120 may be similarly configured to the server computer 100, with memory, a processor, a system bus, and in addition, a processor controlling a display screen 136 to display the GUI 50, 52, and receive user inputs, e.g., from one or more input devices(s) 138, such as a cursor control device, keyboard, keypad, touch screen, joystick, voice activated control device, or combination thereof.

The memory 106, 108 may be combined or separate and may represent any type of tangible computer readable medium, such as random access memory (RAM), read only memory (ROM), magnetic disk or tape, optical disk, flash memory, holographic memory, or combination thereof. In one embodiment, the memory 106, 108 comprises a combination of random access memory and read only memory. In some embodiments, the processor 112 and memory 106 and/or 108 may be combined in a single chip. The network interface(s) 122, 124 allow the computer 100 to communicate with other devices via a computer network, such as a local area network (LAN) or wide area network (WAN), or the Internet, and may comprise a modulator/demodulator (MODEM). An analogous network interface (not shown) is provided on the user's computer 120.

The digital processor 112 can be variously embodied, such as by a single-core processor, a dual-core processor (or more generally by a multiple-core processor), a digital processor and cooperating math coprocessor, a digital controller, or the like. The digital processor 112, in addition to controlling the operation of the computer 100, executes the instructions 110 stored in memory 108 for performing the method outlined in FIG. 4.

The presented method can be integrated in a creative image search engine for retrieving images catering to graphic designers as described, for example, in above-mentioned copending application Ser. No. 12/693,795. For example, in the embodiment of FIGS. 2 and 3, the system 100 generates a graphical user interface (GUI) on display screen 136 through which a user can select an image for modification. Concepts are displayed in a concept selector 140, here shown as a set of user actual areas of the screen 134, each identified by a respective concept label, which can be selected by clicking on the respective area of the screen using the cursor control device 138. The user can select an input image from a set of displayed images retrieved using keyword selectors. Then the user is presented with a set of concepts from which to choose. For example, in FIG. 2, the user has selected an image with content "citylife" and then the concept "capricious." The corresponding concept palette 22 is then retrieved and displayed and is used in the color transfer. A transfer selector 142 is displayed, which allows a user to variably select a degree of transfer between upper and lower limits, here shown as between 0 and 1, although the degree of transfer could be displayed in other ways, such as from "high" to "low." FIG. 3 illustrates the output image 42 and its palette obtained by color transfer based on the "capricious" concept.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

Various aspects of the system and method will now be described in further detail.

A. Concept Palette Learning (S102)

Exemplary concepts include emotions, moods and other aesthetic concepts, such as capricious, classic, delicate, earthy, elegant, romantic, luscious, playful, robust, sensual, serene, spicy, spiritual, and warm (see, for example, the list of concepts in Eiseman, L., Pantone Guide to Communicating with Color Graffix Press, Ltd., 2000) (Hereinafter, "Eiseman").

A probabilistic representation of the concepts is learned by associating each concept, expressed in natural language, with a Gaussian Mixture Model (GMM). These models are referred to as concept palettes. The observation data for the GMM of a concept are color values in a perceptually coherent color space, such as CIE Lab or CIE Luv. In the exemplary embodiment, the color values are the ab representations in the Lab color space of the swatches of all the palettes 12, 14, etc. associated with that concept 16 in the database 24 of palettes. The exemplary concept palettes are thus statistically representative of colors of the respective predefined color palettes. The training component 18 does not consider which predefined palette the swatches originated from, but simply takes as training data, color values of all the swatches. The lightness value L is not considered in the exemplary embodiment. Through this learning, it is ensured that the concept is well represented by a combination of colors. This step can be performed offline, i.e., before an image is selected.

To initialize the parameters of the GMM, agglomerative clustering may be performed on a sub-sample of ab representations of swatches of the predefined color palette 12, 14, etc., until the desired number of clusters is obtained. This number is equivalent to the desired number of swatches in a concept palette, e.g., 16. The means of the Gaussian functions are initialized to the cluster centroid positions. The weights are then initialized to 1/N where N is the number of Gaussians in a concept GMM (i.e., 16). The covariance matrices are initialized to small values on the diagonal such that it is isotropic. This initialization is analogous to that described in the above-mentioned copending U.S. Pub No. 20090231355, incorporated by reference. The concept palette learning component 18 then learns the parameters of the N Gaussian functions in the mixture, which in the exemplary embodiment are the means (a,b color values) of the learned Gaussian functions in the computed GMM and a corresponding mixture weight. The colors of the swatches in the concept palette 22 shown to the user are the values of the means converted from Lab to RGB color space for display. The displayed swatches can be ordered by the weights of their corresponding Gaussian functions.

Let the parameters of the GMM for the concept palette 22 be denoted by $$\lambda^c = \left\{ w_i^c, \mu_i^c, \sum_i^c, i = 1 \ldots N \right\}$$

where $w_i^c$, $\mu_i^c$, and $$\sum_i^c$$

are respectively the weight, mean vector and covariance matrix of Gaussian i, and N denotes the number of Gaussian components. It is assumed in the illustrative embodiments herein that the covariance matrices $$\sum_i^c$$

are diagonal. x denotes an observation (here the vector comprising the two chromaticity coordinates of the color of a swatch of a palette in the input set of palettes) and q denotes which Gaussian emitted x, the likelihood that x was generated by the GMM is:

$$p(x \mid \lambda^c) = \sum_{i=1}^{N} w_i^c p_i(x \mid \lambda^c),$$

where $p_i(x|\lambda^c) = p(x|q=i, \lambda^c)$.

The weights are subject to the constraint:

$$\sum_{i=1}^{N} w_i^c = 1.$$

The components $p_i$ are given by:

$$p_i(x_t \mid \lambda^c) = \frac{\exp\left\{-\frac{1}{2}(x_t - \mu_i^c)' \mid \sum_i^c \mid^{-1} (x_t - \mu_i^c)\right\}}{(2\pi)^{D/2} |\sum_i^c|^{1/2}},$$

where |.| denotes the determinant operator and D denotes the dimensionality of the feature space (here 2, since only a and b values are used).

Let $X = \{x_t, t=1 \ldots T\}$ denote the set of training swatches, which is the (a,b) values all the swatches of the predefined palettes 12, 14, etc. that are associated with the given concept in the palette database 24. The parameters of the GMM can be obtained by maximizing the log-likelihood function logp$(X|\lambda^c)$, which is generally referred to as Maximum Likelihood Estimation (MLE). A known procedure for MLE is the Expectation Maximization (EM) algorithm (See, for example, Dempster, A.; Laird, N. & Ruin, D., "Maximum likelihood from incomplete data via the EM algorithm," *Journal of the Royal Statistical Society*, 39, 1-38, 1977). EM alternates two steps:

1. An expectation (E) step where the posterior occupancy probabilities are computed based on the current estimates of the parameters. The occupancy probability, which is the probability that observation $x_t$ has been generated by Gaussian i, is $\gamma_t(x_t) = p(q_t = i | x_t, \lambda^c)$. This probability is suitably computed using Bayes formula as:

$$\gamma_i(x_t) = \frac{w_i^c p_i(x_t \mid \lambda^c)}{\sum_{j=1}^{N} w_j^c p_j(x_t \mid \lambda^c)}.$$

2. A maximization (M) step where the parameters are updated based on the expected complete-data log-likelihood given the occupancy probabilities computed in the E-step:

$$\hat{w}_i^c = \frac{1}{T} \sum_{t=1}^{T} \gamma_i(x_t),$$

$$\hat{\mu}_i^c = \frac{\sum_{t=1}^{T} \gamma_i(x_t) x_t}{\sum_{t=1}^{T} \gamma_i(x_t)},$$

$$\hat{\Sigma}_i^c = \frac{\sum_{t=1}^{T} \gamma_i(x_t) x_t x_t'}{\sum_{t=1}^{T} \gamma_i(x_t)} - \hat{\mu}_i^c \hat{\mu}_i^{c'}.$$

The EM algorithm is only guaranteed to converge to a local optimum, not to a global one. The location of convergence is dependent on the initialization parameters. In other words, different initialization conditions will, in general, lead to different concept palettes. By using the clustering method for initialization, convergence is more likely to achieve a global optimum. The EM algorithm can be iterated a fixed number of times or until the results approach convergence.

Any suitable palette database 24 or combination of databases may be used as the source of color swatches for training the concept GMMs. The database may have been designed by graphic designers or may be one generated by an online community of users. In the exemplary embodiment, one database was obtained from Eiseman and is referred to herein as CC. The predefined palettes in this database each include three swatches and are organized according to the fifteen concepts: serene, earthy, romantic, robust, playful, classic, cool, warm, luscious, spicy, capricious, spiritual, sensual, elegant, and delicate. There are 24 palettes in each category (i.e., this provides 72 swatches for training each concept palette) and therefore there are 360 palettes in total. These palettes are annotated by experienced color consultants. A second database CL includes 22,000,000 palettes downloaded from a popular social network intended for graphic designers (www.colourlovers.com) using the keywords associated to each concept of CC, derived from Eiseman. These palettes are often tagged by amateur designers and are therefore weakly annotated. In the exemplary embodiment, the labels of these palettes were not used subsequent to retrieval. Rather, these predefined palettes were classified into a respective one of the fifteen concept categories using a technique analogous to that described in above-mentioned U.S. patent application Ser. No. 12/632,107. In this method, the palette is assigned to its most likely concept by comparing its colors to those of the palettes in the CC set.

B. Input Image Selection (S104)

An image 26 may be selected from a predefined database, online database, or provided directly by the user. For example, the user is presented with a database 106 of images, from which he selects one. Alternatively, the user can acquire an input image from his own collection 106. The database may include a single type of images, such as photographs, or may include a heterogeneous dataset containing photos, graphic design images, as well as templates such as those used in document editing applications (e.g., Microsoft Publisher, Microsoft Power Point).

C. Target Concept Selection (S106)

In one embodiment, the user may select a concept from all the concepts for which a concept palette has been generated. In other embodiments, a subset of the concepts 16 is suggested to the user, based on the input image, from which the user selects one for concept transfer.

Figure 2:
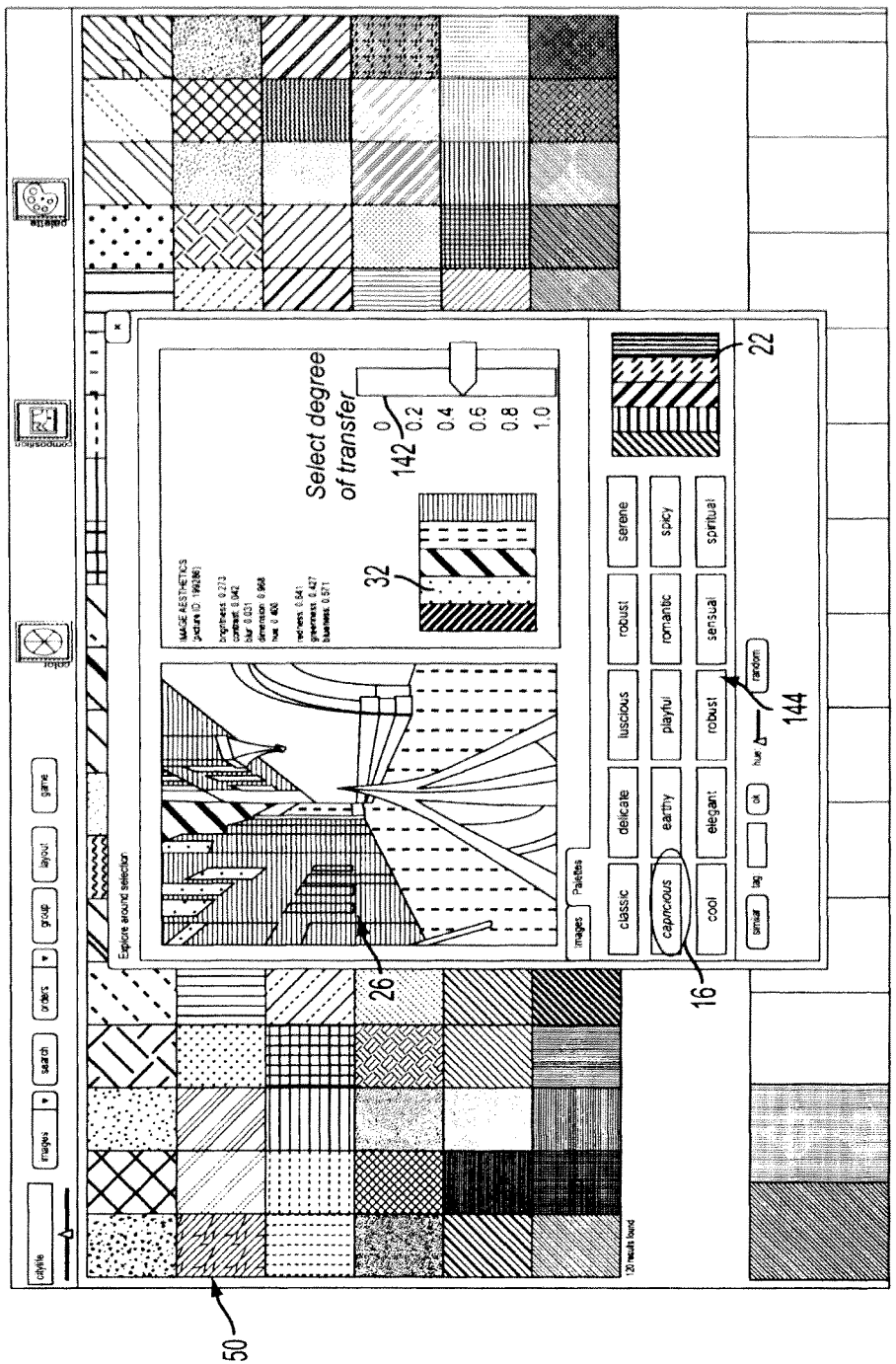
FIG. 2 is a screen shot illustrating a graphical user interface displaying an image, image palette, concept selector, and concept palette for a selected concept.

As illustrated in FIG. 2, a list 144 of concepts is presented to the user from which the user may select one (or more than one). The list may be presented in an ordered fashion according to a given measure of concept appropriateness. In the case where the concepts are ordered, only a subset of the concepts may be shown on the user interface, e.g., the top five or those whose appropriateness measure exceeds a given threshold. Two measures for computing appropriateness are suggested by way of example:

1. Image:Concept Difference: Concepts which are reasonably close to the image are proposed, to avoid radical changes in the color transfer. The measure of appropriateness may be computed based on the similarity between the concept palette 22 and the image palette 32. As the palettes are probabilistic models (GMMs) and the image pixels can be considered to be observations emitted by these models, the similarity between an image and a concept can be expressed as the average log-likelihood of the pixels on the GMM (independence assumption). The scores output by this method for each of the concepts are used to rank the concepts. The appropriateness can then be based, in whole or in part, on the ranking.

2. Reliability: Since different concepts have different degrees of reliability, a measure of the reliability may be considered in determining the appropriateness. While some concepts can clearly be associated with a small number of well-defined colors (most people would agree that the concept "romantic" is associated with the color "pink"), some concepts may be so abstract that the agreement between different users may be low. In such a case, the measure of appropriateness of a given concept can be based on a spread of its GMM in the color space. One suitable measure of degree of spread of a distribution is its entropy: low entropy indicates a concentrated distribution while high entropy indicates a spread distribution. The concepts can thus be ranked according to entropy.

Note that the first measure is image-dependent while the second one is image independent. One or both measures may be used in computing a ranking for display of a subset of suitable concepts or for ordering the list of concepts by appropriateness.

D. Image Palette Extraction (S110)

Two methods may be used to generate the image palette 32:

S110A. Learn an image palette using GMM estimation with the input image pixel data as observations; or S110B Generate an image palette through adaptation of the concept palette GMM with the input image pixel data.

1. Image Palette Extraction Based on Image Pixels (S110A)

In S110A, the GMM may be initialized by clustering some of image pixel color values, as described for the clustering of the swatches in the concept palette learning stage.

For example, let the parameters of the GMM for the input image palette 32 be denoted by $\lambda = \{w_i, \mu_i, \Sigma_i, i=1 \ldots M\}$ where $w_i$, $\mu_i$, and $\Sigma_i$ are respectively the weight, mean vector and covariance matrix of Gaussian i, and M denotes the number of Gaussian components (e.g., 16). If x denotes an observation (here, a vector a,b corresponding to the coordinate values of a pixel color from the image 26) and q denotes which Gaussian emitted x, the likelihood that x was generated by the GMM is:

$$p(x|\lambda) = \sum_{i=1}^{N} w_i p_i(x|\lambda),$$

where $p_i(x|\lambda) = p(x|q=i, \lambda)$.

The weights are subject to the constraint: $\Sigma_{i=1}^{M} w_i = 1$. The components $p_i$ are given by:

$$p_i(x_t | \lambda) = \frac{\exp\left\{-\frac{1}{2}(x_t - \mu_i)' \sum_i^{-1} (x_t - \mu_i)\right\}}{(2\pi)^{D/2} |\Sigma_i|^{1/2}},$$

where |.| denotes the determinant operator and D denotes the dimensionality of the feature space (here D=2, since only a and b values are used). ' represents the transpose of a vector or matrix.

Let $X = \{x_t, t=1 \ldots T\}$ denote the set of input image pixels. The parameters of the GMM are obtained by maximizing the log-likelihood function $\log p(X|\lambda)$, through Maximum Likelihood Estimation (MLE), as described above. In the expectation (E) step, the posterior occupancy probabilities are computed based on the current estimates of the parameters. The occupancy probability, which is the probability that observation $x_t$ has been generated by Gaussian i, is $\gamma_i(x_t) = p(q_t = i | x_t, \lambda)$. This probability is computed as:

$$\gamma_i(x_t) = \frac{w_i p_i(x_t | \lambda)}{\sum_{j=1}^{N} w_j p_j(x_t | \lambda)}.$$

In the maximization (M) step, the parameters are updated based on the expected complete-data log-likelihood given the occupancy probabilities computed in the E-step:

$$\hat{w}_i = \frac{1}{T} \sum_{t=1}^{T} \gamma_i(x_t),$$

$$\hat{\mu}_i = \frac{\sum_{t=1}^{T} \gamma_i(x_t) x_t}{\sum_{t=1}^{T} \gamma_i(x_t)},$$

-continued $$\hat{\Sigma}_i = \frac{\sum_{t=1}^{T} \gamma_i(x_t) x_t x_t'}{\sum_{t=1}^{T} \gamma_i(x_t)} - \hat{\mu}_i \hat{\mu}_i'.$$

2. Image Palette Extraction Based on Image Pixels Through Adaptation of the Concept Palette GMM (S110B)

In the alternative method (S110B), the GMM for the image is initialized with the means, weights, and covariance matrices of the components of the concept palette GMM 22 retrieved at S108. The concept palette GMM may be adapted in a Bayesian way to the input image pixels using the MAP (Maximum A Posteriori) criterion. Therefore, the GMM is initialized to be the concept GMM and the set of input image pixels X={$x_t$, t=1 ... T} are used as new observations for the GMM estimation. The EM algorithm may be used for the MAP estimation, by alternating E and M steps, similarly to the image palette extraction described above.

The expectation (E) step computes the occupancy probability of observation $x_t$, which is the probability that $x_t$ has been generated by Gaussian i. This probability may be formulated as $\gamma_i(x_t)=p(q_t=i|x_t,\lambda^{in})$, where q is the Gaussian which has generated $x_t$. The posterior occupancy probability is computed based on the current estimates of the parameters as follows:

$$\gamma_i(x_t) = \frac{w_i^{in} p_i(x_t | \lambda^{in})}{\sum_{j=1}^{N} w_j^{in} p_j(x_t | \lambda^{in})}$$

In the maximization (M) step, the parameters are updated based on the expected complete-data log-likelihood given the occupancy probabilities computed in the E-step:

$$\hat{w}_i^{in} = \frac{\sum_{t=1}^{T} \gamma_i(x_t) + \tau}{T + N\tau}$$

$$\hat{\mu}_i^{in} = \frac{\sum_{t=1}^{T} \gamma_i(x_t) x_t + \tau \mu_i^c}{\sum_{t=1}^{T} \gamma_i(x_t) + \tau}$$

$$\hat{\Sigma}_i^{in} = \frac{\sum_{t=1}^{T} \gamma_i(x_t) x_t x_t' + \tau \{\sum_i^c + \mu_i^c \mu_i^{c'}\}}{\sum_{t=1}^{T} \gamma_i(x_t) + \tau} - \hat{\mu}_i^{in} \hat{\mu}_i^{in'}$$

Here τ is an adaptation factor which balances the new observations against the a priori information. This value is suitably chosen manually and may be set at any suitable number, such as τ=10. In order for the covariance matrix of the concept palette GMM be comparable to that of the input image palette, each Gaussian function (swatch) of the concept palette may be multiplied by a factor. This factor is computed by dividing the number of input image pixels by the number of swatches belonging to that concept. The algorithm may be stopped bases on a stopping criterion or when convergence is approached.

Figure 6:
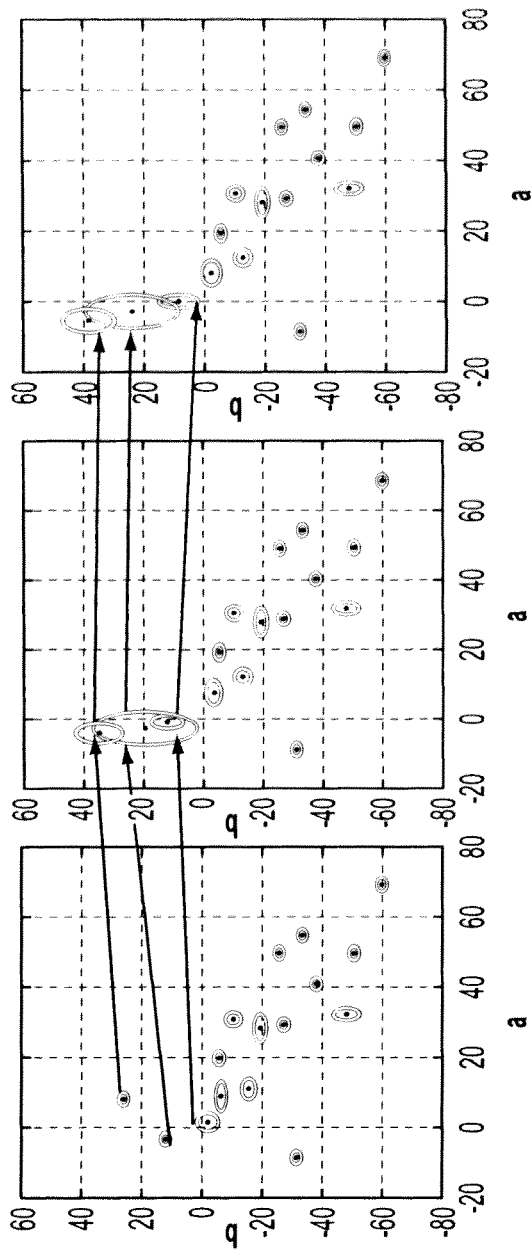
FIG. 6 illustrates generation of an image palette through Gaussian Mixture Model (GMM) adaptation.

FIG. 6 illustrates functions of an initialized GMM (a) corresponding to the concept palette and after three and five iterations of the EM algorithm (b and c). Arrows show correspondences between adapted Gaussian components.

E. Concept-to-Input Palette Mapping (S112)

Swatches (colors) in the input palette are mapped to swatches (colors) in the concept palette. The mapping process may be dependent on the method used to derive the input image palette (S110A or S110B). In the exemplary embodiment, the mapping results in every image palette color being matched to a corresponding concept palette color. However, it is also contemplated that fewer than all the image palette colors (swatches) may be mapped, such as the most dominant (highly weighted) colors. Where the image palette 32 is a GMM derived from the image pixels without reference to the concept palette (S110A), swatches of the concept palette 22 are mapped to swatches of the input palette 32 using the chromaticity distances between them. This method is referred to as distance-based mapping.

Where the image palette 32 is a GMM derived from the image pixels initialized with the concept palette (S110B), the adaptation framework inherently maps input palette swatches to concept swatch palettes. This method is referred to as adaptation-based mapping.

If the user decides to modify the concept palette, for example, by deleting unwanted swatches, the weights of the remaining concept palette colors may be automatically normalized so that they sum to 1. In the case of S110B, the image palette may be recomputed, based on the new concept palette. This is not necessary, of course, if the image palette is derived solely from pixels of the image. In both cases, the concept palette to input palette mapping is recomputed.

1. Distance-Based Mapping (S112A)

After the input image palette 32 is created at S110A, each swatch of the image palette 32 is associated with a respective single swatch in the concept palette. The measure used as a criterion for mapping swatches may be the Euclidean distance between the ab representations of the swatches in the Lab color space. However, other distance metrics, as well as representations of swatches in other color spaces can also be used. The distance metric used should reflect the chromatic distances between swatches. The dominant (most highly weighted) swatches in the image palette may receive priority in the mapping.

The input palette extracted from the image is an M-dimensional GMM. The concept palette is an N-dimensional GMM. In one embodiment, N≤M.

Let the M input palette swatches be represented by $S_{in_1} \ldots S_{in_M}$; the N concept palette swatches by $S_{c_1} \ldots S_{c_N}$. The output is M mapped concept palette swatches $S'_{c_1} \ldots S'_{c_M}$ using the distance-based approach. As noted above, $S_{c_1} \ldots S_{c_N}$ and $S_{in_1} \ldots S_{in_M}$ are the ab channel representations of the swatch colors of the concept and input palettes in the ab color space respectively. $S'_{c_1} \ldots S'_{c_M}$ are the ab channel representations of the swatch colors of the resulting mapped concept palette 36. The goal of this approach is to obtain an M-dimensional mapped concept palette 36, for which each swatch is matched with a corresponding swatch in the input palette. In one embodiment, this is performed with a greedy algorithm, as illustrated below. The Euclidean distance between the first swatch (highest weighted swatch) of the input palette and each swatch from the concept palette is computed. The swatch from the concept palette that has the closest distance is placed as the first swatch of the mapped concept palette. This process is repeated for the remaining swatches of the input palette. The swatches of the input palette are sorted by the weights of their associated Gaussian functions. Therefore, the most highly weighted swatch chooses its closest color first and so on.

In one embodiment of this method, a concept palette swatch can be mapped to more than one image palette swatch, but each image palette swatch is mapped to no more than one concept palette swatch. To limit the number of times a concept palette swatch is mapped to an image palette swatch, a swatch may be removed from consideration once it has been used in a predetermined number of mappings (e.g., 2 or 3). In the exemplary embodiment, concept swatches may be selected up to three times (i.e., up to three image palette swatches can be mapped to the same concept palette swatch). This is achieved by initializing a counter (ctr) for each concept color and incrementing the counter each time that color is selected. This allows for a more flexible mapping than is the case when a concept palette swatch can be mapped no more than once. The dominant colors (most highly weighted) in the input palette are thus provided more chances to select their match from the concept palette. The algorithm considers the input image palette swatch with the highest weight first, and then proceeds to the next highly weighted input age palette swatch and so forth.

The pseudocode for this algorithm may be as follows:

```
A = {1, 2, ..., N}
for k = 1 to N
    ctr[k] = 0
for i = 1 to M (taken in decreasing order of weight)
    j* = argmin∀j∈A{√(S_cj − S_in_i)²}
    S_cj' = S_cj*
    ctr[j*] = ctr[j*]+1
    if ctr[j*] == 3
        A = A\{j*}
```

$j^*$ is the concept swatch which gives the minimum Euclidean distance between it and the ith image palette swatch.

Another method for distance-based mapping is based on the Earth Mover's Distance (EMD). The EMD algorithm attempts to solve the following optimization problem:

$$\min_{\{f_{i,j}\}} \sum_{i=1}^{M} \sum_{j=1}^{N} f_{i,j} G(S_i^{in}, S_j^c)$$

subject to:

$$\sum_{i=1}^{M} f_{i,j} = w_j^c, \; j = 1, \ldots, N \quad (C1)$$

and:

$$\sum_{j=1}^{N} f_{i,j} = w_i^{in} \; i = 1, \ldots, M \quad (C2)$$

where G is the cost matrix containing the Euclidean distance between each input image swatch $S_i^c$ and concept palette swatch $S_j^c$. The quantities $w_i^{in}$ and $w_j^c$ are the weights for the i-th input and j-th concept palette swatch respectively. The flow $f_{i,j}$ can be considered to be the part of swatch $S_i^{in}$ which is mapped to $S_j^c$. Constraint (C1) requires that each input image swatch has flows that sum to its weight. Similarly, constraint (C2) requires that each concept model swatch has flows that sum to its weight. Therefore each concept swatch is guaranteed to be associated with at least one input swatch and vice versa.

2. Adaptation-Based Mapping (S112B)

In this second mapping method, the input image palette 32 has been obtained by adapting the concept GMM using pixels from the input image as observations for the GMM at S110B. This representation of the input ensures that the Gaussian parameters of the adapted model retain a correspondence with those of the concept palette GMM. This inherent correspondence eliminates the need for a heuristic swatch-mapping criterion such as the distance-based mapping scheme described above in S112A. As a result, the mapped concept palette 36 corresponds to the concept palette 22, with its swatches ordered according to the swatches of the image palette to which its swatches are matched (this may involve reordering the image palette swatches or the concept palette swatches).

F. Color Transfer (S114)

The image pixels are modified based on the mapped concept palette 36 (target palette) (which is the same as the concept palette in the adaptation case). In one embodiment, a linear transformation is computed between the input image palette 32 and the mapped concept palette 36. This transformation is then applied to the pixels of the input image to yield the output image.

In one embodiment, the color-transferred, or output, image 42 is obtained by applying an affine transformation to the ab channel values of every pixel of the input image. The statistics (mean and standard deviation of the Gaussian function representation) of the i-th image palette swatch can be matched to those of the i-th target palette swatch as follows:

$$\text{Let } A_i = \left(\sum_i^t\right)^{1/2} \left(\sum_i^{in}\right)^{-1/2}; \text{ and}$$

$$B_i = \mu_i^t - \mu_i^{in}\left(\sum_i^t\right)^{1/2}\left(\sum_i^{in}\right)^{-1/2} \text{ where } \sum_i^t \text{ and } \sum_i^{in}$$

denote the covariance matrices of the i-th components of the GMMs representing the target and image palettes respectively, and $\mu_i^t$ and $\mu_i^{in}$ denote their means. In the exemplary embodiment, the covariances are chosen to be diagonal. The square-root is thus defined in unique manner.

The color transfer map functions used in the affine transformation are computed using $A_i$ and $B_i$ as well as the previously computed occupancy probabilities $\gamma_i(x)$, as follows:

$$A(x) = \sum_{i=1}^{M} \gamma_i(x) A_i \text{ and}$$

$$B(x) = \sum_{i=1}^{M} \gamma_i(x) B_i$$

Finally, the affine transformation is applied to the ab channels of the input image pixel $x^{in}$ to obtain the corresponding values in the output image pixel, denoted by $x^{out}$:

$$x^{out} = A(x^{in})x^{in} + B(x^{in})$$

$A(x^{in})$ and $B(x^{in})$ are the $A(x)$ and $B(x)$ values computed above. The lightness channel L values of the output image pixels are set to be the same as those of the input image pixels.

Different levels of transfer, denoted by K, can be performed on the image by modification to the affine transformation. K is introduced into the affine transformation using the following formulations of $A_i$ and $B_i$:

$$A_i = K\left[\left(\sum_i^t\right)^{1/2}\left(\sum_i^{in}\right)^{-1/2}\right] + (1-K)I;$$

$$B_i = K\mu_i^t + (1-K)\mu^{in} - \mu_i^{in}\left[K\left[\left(\sum_i^t\right)^{1/2}\left(\sum_i^{in}\right)^{-1/2}\right] + (1-K)I\right],$$

where I is the identity matrix.

Using these formulations, for K=1, $A_i$ and $B_i$ revert to the original equations while for K=0, $A_i$ and $B_i$ revert to the identity matrix and the null matrix respectively. Therefore, by varying K from 0 to 1, the level of concept transfer may be controlled in a linear fashion.

In one embodiment, all pixels of the image are subjected to the transformation. In other embodiments, less than all, i.e., only a selected set of pixels may be modified, which may be pixels in a user-selected region of the image.

G. Visualization and Tuning (S116)

In the exemplary embodiment, the user is shown the result of the transfer operation. As will be appreciated, the entire modified image palette 44 may also be displayed, or in some embodiments, its most highly weighted swatches. For example, as shown in FIG. 3, only the five most highly weighted swatches are shown as the remaining ones have negligible weights in their respective GMMs.

The user has the option to tune the result (using the selector 142) by altering the parameter regulating the degree of the transfer K.

In one embodiment, the user can also choose to modify the concept palette 22, by adding, deleting, or replacing, a swatch. For example, the colors of the displayed concept palette (or the entire color palette) may correspond to actuable area(s) of the screen. If a user clicks on one of the colors, a popup is displayed which asks the user if he or she would like to change the concept color palette by adding, deleting, or replacing a swatch. The popup may also display a set of colors, which allows a user to select a replacement or additional color swatch.

As will be appreciated, in some embodiments, the modified image may be output to an output device other than display device 136, such as a printer, either directly, or after further workflow processing of a document which contains it. In this embodiment, the modified image palette 44 need not be printed. However, the palette 44 may be used for modifying other components of the document, such as for generating background colors, image text colors, and the like.

Applications

The exemplary embodiment may be used in variable data applications such as 1 to 1 personalization and direct mail marketing. Variable document creation poses various challenges to the assurance of a proper aesthetical level due the portion of dynamic content such documents can include. One of the challenges is how to treat visual aspects dynamically within the variable data workflow, so that the enhancement or management operations are handled in a more context-sensitive fashion. The exemplary embodiment describes a method for addressing one of these needs, namely altering the colors in an image based on a concept selected by a user.

Variable data printing is not the only application of the method. Other applications, such as image and document asset management or document image/photograph set visualization, etc. can also profit from the method.

Without intending to limit the scope of the exemplary embodiment, the following example illustrates the application of the method.

EXAMPLE

The concept-based image color transfer approach described above was tested on three types of digital assets: natural images, graphic design images, and brochures. The concept used is selected by the user from a list of suggested concepts. The concept palettes used are obtained from the two databases of palettes: CC and CL, described above. The results obtained for different types of images show that the exemplary method provides modified images which can have a much higher variation in color than for an existing method for modification of images described in Yang & Peng. In Yang and Peng's approach, the variation is lost due to the histogram matching performed by the algorithm used between the input image, which has one dominant color, and the target image, which also has one dominant color. Accordingly, a more realistic result is obtained with the present method. The results obtained also show that the Yang & Peng approach fails to maintain any color variation for images which do not satisfy their dominance constraint, and which therefore do not have one dominant color.

The distance-based mapping approach and the adaption-based approach gave slightly different results, with the adaptation-based approach sometimes showing a wider color variation than the distance-based approach (since the distance-based approach allows a concept palette swatch to be mapped to up to three image palette swatches).

In preliminary experiments, where users were not limited in their choice of concepts or encouraged to select from the most appropriate ones, artifacts occasionally resulted due to unsuccessful concept transfer. These artifacts could be reduced by minimizing the user's selections of less appropriate concept choices at S106.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for color transfer comprising:
receiving a concept selected by a user from a predefined set of concepts;
retrieving a concept color palette from computer memory corresponding to the user-selected concept, the concept color palette comprising a first set of colors, each of a set of the concept color palettes having been automatically generated from a respective set of predefined color palettes;
computing an image color palette for an input image, the image color palette comprising a second set of colors that are representative of pixels of the input image;
mapping colors of the image color palette to colors of the concept color palette to identify, for colors of the image color palette, a corresponding color in the concept color palette;
computing a transformation based on the mapping;
for pixels of the input image, computing modified color values based on the computed transformation, to generate a modified image; and
outputting the modified image.

2. The method of claim 1, wherein the computing of the image color palette comprises computing a Gaussian mixture model (GMM) wherein means of Gaussian functions in the GMM comprise the second set of colors.

3. The method of claim 2, wherein the GMM is learned through Maximum Likelihood Estimation (MLE).

4. The method of claim 3, wherein observations for learning the GMM comprise color values for pixels in the image.

5. The method of claim 2, wherein the GMM is initialized with the first set of colors and corresponding weights.

6. The method of claim 1 wherein the computing of the image color palette comprises adaptation of the concept color palette to colors of the pixels of the image which provides the mapping of the colors of the image color palette to colors of the concept color palette.

7. The method of claim 1, wherein the concept color palette colors are learned from a set of predefined color palettes associated with the concept.

8. The method of claim 1, further comprising, for each of a set of concepts, learning a concept color palette based on colors of the set of predefined color palettes associated with the concept, each predefined color palette comprising a set of colors.

9. The method of claim 8, wherein the learning of the concept color palette comprises learning a GMM, wherein colors of the concept color palette are means of the GMM.

10. The method of claim 9, wherein observations for learning the GMM for the concept color palette are colors of the predefined color palettes.

11. The method of claim 1, wherein each of a set of concept color palettes is statistically representative of colors in a set of predefined color palettes and is associated with a respective description and wherein the retrieving of the concept color palette includes retrieving a concept color palette from the set of concept color palettes which has a description which matches a description selected by a user.

12. The method of claim 1, wherein the concept color palette includes at least eight colors.

13. The method of claim 1, wherein the image color palette includes at least eight colors.

14. The method of claim 1, wherein the image color palette includes at least as many colors as the concept color palette.

15. The method of claim 1, wherein the method includes providing for displaying a set of concept descriptions on a graphical user interface whereby a concept description is selectable by a user.

16. The method of claim 1, further comprising providing for displaying at least one of the image color palette, concept color palette, and modified image.

17. The method of claim 1, wherein the computing of the transformation comprises computing an affine transformation between the image color palette and the concept color palette.

18. The method of claim 1, further comprising providing for a user to select a degree of transfer whereby the transformation is adjustable.

19. A computer program product comprising a non-transitory recording medium storing instructions, which when executed by a computer, perform the method of claim 1.

20. An apparatus for performing the method of claim 1 comprising memory which stores instructions for performing the method and which stores a set of concept color palettes, and a processor in communication with the memory for executing the instructions.

21. The method of claim 1, wherein each concept color palette comprises a same number of colors.

22. A method for color transfer comprising:
receiving a concept selected by a user from a predefined set of concepts;
retrieving a concept color palette from computer memory corresponding to the user-selected concept, the concept color palette comprising a first set of colors;
computing an image color palette for an input image, the image color palette comprising a second set of colors that are representative of pixels of the input image;
mapping colors of the image color palette to colors of the concept color palette to identify, for colors of the image color palette, a corresponding color in the concept color palette, the mapping including identifying a color of the concept color palette for each color of the image color palette, whereby each image color palette color is associated with a single concept color palette color;
computing a transformation based on the mapping including computing a linear transformation between the image color palette and the mapped concept color palette;
for pixels of the input image, computing modified color values by applying the computed transformation to pixels of the image to generate a modified image; and
outputting the modified image.

23. An image adjustment apparatus comprising:
memory which stores a set of concept color palettes, each concept color palette comprising a respective set of colors and being associated in the memory with a respective natural language description, each of the concept color palettes comprising a same number of colors;
memory which stores instructions for:
  retrieving one of the concept color palettes from the memory corresponding to a user-selected concept, the concept color palette comprising a first set of colors,
  receiving a user-selected input image and computing an image color palette for the input image, the image color palette comprising a second set of colors,
  mapping colors of the image color palette to colors of the concept color palette to identify, for each of the colors of the image color palette, a corresponding color in the concept color palette,
  computing a transformation based on the mapping, and
  for pixels of the input image, computing modified color values based on the computed transformation to transform the input image; and
a processor in communication with the memory which executes the instructions.

24. The apparatus of claim 23, further comprising a graphical user interface in communication with the processor for displaying the retrieved concept color palette, modified image, and optionally a modified image color palette.

25. The image adjustment apparatus of claim 24, wherein the graphical user interface is further configured for displaying a selector whereby a user selects a degree of transfer, whereby the transformation is adjustable.

26. The apparatus of claim 23, further comprising a palette training component which learns each of the set of the concept color palettes from a respective set of predefined color palettes.

* * * * *